United States Patent Office 2,757,152
Patented July 31, 1956

2,757,152

WATER-REPELLENT COMPOSITIONS COMPRISING A POLYSILOXANE, A UREA- OR MELAMINE-FORMALDEHYDE RESIN AND A CURING AGENT

Myer Michael Solomon, Albany, N. Y., assignor to General Electric Company, a corporation of New York No Drawing. Application September 23, 1952,
Serial No. 311,159

33 Claims. (Cl. 260—29.2)

This invention is concerned with compositions of matter suitable for rendering various materials water-repellent, especially textile materials and papers. More particularly, the invention is concerned with a composition of matter comprising (a) an organopolysiloxane free of silicon-bonded hydrogen in which the organic groups are attached to silicon by carbon-silicon linkages, at least 50 per cent of the organic groups being methyl groups, the remainder of the groups being selected from the class consisting of methyl, ethyl, and phenyl radicals, (b) an aminoplast resin selected from the class consisting of urea-aldehyde and melamine-aldehyde resins or condensation products, and (c) a metallic salt selected from the class consisting of inorganic and organo-metallic salts capable of effecting curing of the organopolysiloxane, the metallic ion of which is selected from the class consisting of titanium, zirconium, tin, lead, aluminum, zinc, strontium, and nickel.

It has been known heretofore that various bodies, for example, various textiles, can be rendered water-repellent by treatment of the latter with certain organo-silicon compositions. Thus, according to Norton Patent 2,386,259, various objects can be rendered water-repellent by treating them with the product of hydrolysis of a methyldihalogenosilane of the formula $CH_3SiHX_2$ where X is a halogen. Based on the use of the hydrolysis product of a methyldihalogenosilane described in the aforementioned Norton patent, mixtures of the latter material in combination with organopolysiloxanes free of silicon-bonded hydrogen have also been suggested for inducing water-repellency of textiles. Heretofore, it has been found almost essential to employ as one of the ingredients used for treating the bodies to render them water-repellent, the hydrolysis product of a methyldihalogenosilane, whether hydrolyzed by itself or interacted in such a fashion as to obtain chain-stopped organopolysiloxanes containing intercondensed organosiloxy units, e. g., dimethylsiloxy units, free of silicon-bonded hydrogen, in addition to the organohydrogensiloxy units, e. g., methylhydrogensiloxy units ($CH_3SiHO$), containing silicon-bonded hydrogen. Although the water-repellency induced by the use of mixtures containing the organopolysiloxanes having silicon-bonded hydrogens are relatively satisfactory, in the treatment of certain fabrics such as, for example, cotton, it has been found that after only a few launderings, the water-repellency is substantially reduced when tested in accordance with standard procedures for determining water-repellency. In addition, the essential ingredient employed in making the organopolysiloxanes containing the silicon-bonded hydrogen, for instance, methyl dichlorosilane ($CH_3SiHCl_2$), is difficult to obtain in satisfactory yields employing any of the presently known methods for making organohalogenosilanes. Because of this, the demand for water-repellents containing hydrolysis products of methyldichlorosilane far exceeds the supply of this particular material. Moreover, water-repellents employing organopolysiloxanes containing silicon-bonded hydrogen are usually employed in the form of solutions in organic solvents to minimize undesirable gelation of the organopolysiloxane. Such organic solvents are often undesirable because of fire and health hazards, while at the said time adding to the expense of the water-repellent not only as a medium in which the organopolysiloxane is dissolved, but also because it makes the applying procedure more expensive. Finally, the organopolysiloxanes containing silicon-bonded hydrogen liberate hydrogen on standing, hence creating a hazardous condition.

One of the objects of this invention is to prepare organopolysiloxane-containing water-repellents capable of inducing improved water-repellency in various porous materials including textiles and paper.

Another object of the invention is to obtain water-repellent textiles possessing a high degree of water-repellency, even after a relatively large number of launderings or dry cleanings.

A still further object of the invention is to prepare a water-repellent composition capable of imparting a high degree of water-repellency to various materials employing a liquid medium for the organopolysiloxane composition which is free of fire and health hazards and, in addition, is relatively inexpensive.

Another object of the invention is to prepare water-repellent compositions based on a mixture of ingredients containing an organopolysiloxane free of silicon-bonded hydrogen, thus obviating the necessity of using organo-silicon intermediate compositions containing silicon-bonded hydrogen which are difficult to obtain.

An additional object of the invention is to impart an improved "hand" to textile materials by the use of organopolysiloxanes containing water-repellent compositions.

In accordance with my invention, I fulfill all the objects hereinbefore described and obviate all of the deficiencies presently found in water-repellent compositions based on organopolysiloxanes containing silicon-bonded hydrogen by treating various bodies, for instance, textiles, papers, etc., with a mixture of ingredients comprising (a) an organopolysiloxane free of silicon-bonded hydrogen in which the organic groups are attached to silicon by carbon-silicon linkages, at least 50 per cent of the organic groups being methyl groups, the remainder of the organic groups being selected from the class consisting of methyl, ethyl, and phenyl radicals, (b) an aminoplast in the incompletely condensed state and selected from the class consisting of urea-aldehyde and melamine-aldehyde resins or condensation products, and (c) a metallic salt selected from the class consisting of inorganic and organo-metallic salts capable of effecting curing of the aforesaid organopolysiloxane, the metal ion of said salt being selected from the class consisting of titanium, zirconium, tin, lead (which are generally members of group IV of the periodic table), aluminum, zinc, nickel and strontium.

It was entirely unexpected and in no way could have been predicted that the use of the aforementioned combination of ingredients as treating materials would give the superior water-repellency results described above and more particularly illustrated in the examples below, since attempts to use the individual ingredients separately or other combinations of the ingredients other than the combination of the three materials for the treatment of the various materials gave markedly inferior results as far as water-repellency was concerned. Thus, some of the metallic salts herein described when employed alone, although they are capable of inducing initial water-repellency on textiles, have no durable effect on the latter materials after one or two launderings. In addition, attempts to use only the organopolysiloxane free of silicon-bonded hydrogen with the metallic salts employed in the practice of the present invention gave poor water-repellency on textiles, even after the first treatment of the textiles. Finally, it has been found that, although the aminoplast resins employed in the practice of the present invention when employed in combination with nylon cloth do impart some measure of water-repellency, this water-repellency effect is greatly reduced after one or two launderings; the use of aminoplast resins on other types of textiles, for instance, cotton and rayon, imparts no appreciable water-repellency.

Among the urea and melamine resins in the incompletely condensed stage which may be employed may be mentioned, for example, condensation products of either urea or melamine with any of the well-known aldehydes, for instance, formaldehyde, acetaldehyde, propionaldehyde, furfural, etc. Preferably, I employ as the resinous component, namely, the aminoplast resinous component, a water-soluble, low molecular weight condensation product of urea or melamine with formaldehyde, especially the methylol ureas, for instance, dimethylol urea, etc., and the methylol melamines, for example, trimethylol melamine, hexamethylol melamine, etc. Of course, the use of organic-soluble aminoplasts, for instance, alcohol-soluble aminoplasts, are not precluded and may be employed without departing from the scope of the invention.

The organopolysiloxanes free of silicon-bonded hydrogen which are employed in the practice of this invention are generally those consisting of silicon-oxygen linkages, containing the stipulated monovalent hydrocarbon radicals attached to the silicon atoms of the organopolysiloxane by carbon-silicon linkages, and have an average ratio of from about 1.1 to 2.25, preferably from about 1.4 to about 2.1, hydrocarbon groups per silicon atom. These organopolysiloxanes free of silicon-bonded hydrogen (for brevity hereinafter referred to as "organopolysiloxane") may be either linear, cyclic, or branch-chained, and may be, for instance, oily materials, resinous materials, or even solids which are readily dispersible or soluble in solvents. Many examples of such organopolysiloxanes (which may also contain silicon-bonded hydroxyl groups) may be found disclosed, for instance, in Rochow Patents 2,258,218– 222 and in Patnode Patents 2,469,888 and 2,469,890, all of the aforementioned patents being assigned to the same assignee as the present invention. The organopolysiloxanes may be obtained by the hydrolysis of the proper methyl or mixture of methyl halogenosilanes or any other hydrolyzable methylsilane containing a silicon-bonded hydrolyzable group. Thus, one may hydrolyze dimethyldichlorosilane alone or cohydrolyze mixtures of various hydrolyzable methylsilanes, for example, mixtures of methyltrichlorosilane and dimethyldichlorosilane, mixtures of dimethyldichlorosilane and diphenyldichlorosilane, mixtures of dimethyldichlorosilane and diethyldichlorosilane, mixtures of methyltrichlorosilane, dimethyldichlorosilane, and phenyltrichlorosilane, mixtures of methyltrichlorosilane, dimethyldichlorosilane, and trimethylchlorosilane, mixtures of methyltrichlorosilane, phenyltrichlorosilane, dimethyldichlorosilane, and diphenyldichlorosilane, etc. It will, of course, be apparent to those skilled in the art that in the preparation of the organopolysiloxane, proper precautions will be taken in forming the mixtures of hydrolyzable organosilanes so as to have present in the hydrolysis product an organopolysiloxane in which at least 50 per cent of the silicon-bonded organic groups are methyl groups. The presence of inert substituents, for instance, halogens, for example, chlorine atoms, etc., on the phenyl radicals, especially substituents which are inert either in the water-repellent composition or are inert in the application for which the water-repellent composition is intended, are not precluded. Obviously, where the phenyl radicals attached to the silicon atoms of the organopolysiloxane by carbon-silicon linkages contain inert substituents thereon, the latter should not deleteriously affect the material being rendered water-repellent or interfere with the action of the metallic salts or otherwise adversely affect any other ingredient which may be employed in the composition used for inducing water-repellency.

The metallic salts (or mixtures thereof) which are usable in the practice of my invention may be any of the inorganic or metallo-organic salts described above and capable of effecting cure of the organopolysiloxane free of silicon-bonded hydrogen without deleterious effect on the water-repellent composition or the ingredients contained in such water-repellent compositions, or on the operability of the latter for inducing water-repellency on various materials which may be treated with the water-repellent composition. The metallic salts (for brevity hereinafter so referred to) may be either water-soluble, soluble in the organopolysiloxane free of silicon-bonded hydrogen, soluble in solvents which are mutual solvents for both the metallic salt and the organopolysiloxane, etc. It should, however, be noted that the metallic salt may be employed in combination with the organopolysiloxane and the aminoplast resin in such form, for instance, as dispersions, emulsions, etc., whereby advantage of the curing properties of the metallic salt can be effectively taken without the necessity of using any of the particular solvent media described above for the metallic salt. Where it is desired that the material being rendered water-repellent be free of color change due to any coloring in the water-repellent composition, the metallic salt should itself be free of extraneous color either when employed in solution form, in emulsion or dispersion form, or when present on the treated material, etc.

There are various classes of metallic salts which satisfy the requirements recited above for the metallic salts employed in preparing the water-repellent compositions herein described. One class of such salts comprises the metallic salts, particularly the water-soluble metallic salt in which the metal ion is derived from group IV in the periodic table. Among such metallic salts may be mentioned the water-soluble salts (both inorganic and metallo-organic) of, for instance, titanium, zirconium, tin, lead, etc. Included among water-soluble salts (including group IV ions) which are satisfactory in the practice of the present invention are, for instance, zirconium tetrachloride, zirconium oxychloride (including its hydrates), zirconium sulfate and its hydrates, zirconium acetate, zirconium nitrate, zirconium ammonium carbonate, zirconium oxybromide, stannous chloride, stannic chloride, alumium chloride, aluminum sulfate, aluminum citrate, aluminum zinc chloride, zirconium oxalate having the formula

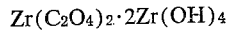

$$Zr(C_2O_4)_2 \cdot 2Zr(OH)_4$$

zinc acetate, zinc nitrate, nickel sulfate, nickel acetate, nickel chloride, titanium tetrachloride, titanium oxychloride, titanium nitrate (TiO·N$_2$O$_5$·6H$_2$O), titanium oxalate [Ti$_2$(C$_2$O$_4$)$_3$·10H$_2$O], lead chloride and strontium chloride (which are good as curing agents when used on nylon), etc. Obviously, various complexes, both organic and inorganic, of these metallic salts may also be employed without departing from the scope of the invention. Among such complexes may be mentioned, for instance, complexes formed by treating zirconium hydroxide with mannitol in a dilute base such as, for instance, sodium hydroxide, etc. Obviously, hydrates of the various metallic salts described generically and specifically above may also be employed.

In addition to the water-soluble salts described above, it may also be advantageous to employ water-insoluble metallic salts which are soluble in organic solvents or in the organopolysiloxane, or which can be readily dispersed or emulsified with the organopolysiloxanes so as to be in intimate contact with the latter in order to exercise their curing function. Among the metallic salts whose metallic ions are those described above which are soluble in various organic solvents, for instance, alcohols, aromatic solvents such as, for instance, benzene, toluene, xylene, etc., are, for example, metallic salts of organic acids, for instance, acid radicals yielding the resinate, linoleate, stearate, oleate, or even the lower acid radicals, such as those yielding the butyrate, octoate, hexoate, etc. radicals as well as naphthenate salts. The prime requisite for such types of metallo-organic salts is that they be soluble in the organic solvent, or in the organopolysiloxane free of silicon-bonded hydrogen, or in some medium which permits dispersion of the metallic salt so as to bring it into intimate contact with the organopolysiloxane and permit the metallic salt to exercise its curing function. Examples of such salts are, for instance, zinc naphthenate, zinc octoate, tin octoate, tin naphthenate, etc. In some applications, some of the salts mentioned above, e. g., nickel salts, may be undesirable because of the fact that they may impart undesirable color to the material being rendered water-repellent. However, where this factor is of little or no importance, it will be apparent that the variety of metallic salts which may be employed in combination with the organopolysiloxane and aminoplast resin is relatively large. The prime requisite in the selection of the metallic salt to be employed in combination with the organopolysiloxane free of silicon-bonded hydrogen and the aminoplast resin is that it exerts a curing effect upon the organopolysiloxane at the temperatures at which the water-repellent composition is converted on the surface of the treated material to its final water-repellent form.

The preferred salts which are found particularly advantageous in the practice of the present invention and which appear to give optimum results over a wide range of different types of treated materials are, for instance, the zirconium and titanium salts such as, for example, zirconium tetrachloride, zirconium oxychloride

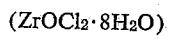
(ZrOCl$_2$·8H$_2$O)

zirconium sulphate, titanium tetrachloride, titanium oxychloride (TiOCl$_2$), mixtures of zirconium oxychloride and a tin chloride, for instance, stannous chloride, etc. These materials are essentially colorless, permit curing of the organopolysiloxane at a rapid rate, and give good initial spray ratings as well as laundering durability.

The amount of metallic salt used may be varied widely without departing from the scope of the invention. Thus, on a weight basis and based on the weight of the organopolysiloxane free of silicon-bonded hydrogen, the metal in the metallic salt may comprise from about 0.1 to about 20 per cent, by weight, or more, optimum results generally being obtained in the range of from about 5 to 12 per cent, by weight, especially when employing an inorganic zirconium salt. The amount of metallic salt employed with the water-repellent composition will depend upon such factors as, for instance, the particular metallic salt used (including the metal ion), the particular type of organopolysiloxane employed, the type of material (e. g., textile, paper, etc.) to which the water-repellent composition will be applied, the solubility of the metallic salts as well as the medium in which the metallic salt will be used, the treating conditions including the temperature and time of treatment, the presence or absence of pressure during application of the water-repellent composition to the treated material, etc.

The proportion of urea or melamine resins used with the organopolysiloxane may also be varied within very wide limits without departing from the scope of the invention. Generally, in a treating mixture, on a weight basis, considering only the weight of the aminoplast and the organopolysiloxane free of silicon-bonded hydrogen, one may advantageously employ for each part of organopolysiloxane in the treating mixture, from about 0.5 to 10 to 12 parts of the aminoplast resin, preferably from about 1 to 10 parts of the aminoplast resin per part of organopolysiloxane. Depending on the degree of water-repellency desired, on a per cent weight basis, it may be found advantageous to employ the organopolysiloxane in an amount ranging from about 5 to 50 per cent of the weight of the aminoplast resin, preferably from about 10 to 35 per cent, by weight, thereof.

Generally, it is also desirable in employing the mixture of ingredients which I have found eminently suitable for inducing water-repellency to also incorporate a curing agent for the aminoplast resin. Although in some instances the metallic salt employed in combination with organopolysiloxane may also cause curing of the aminoplast resin to the substantially infusible and insoluble state, nevertheless, it is desirable to incorporate a separate curing agent for the aminoplast resin. Among such curing agents or catalysts which may be used expressly for the purpose of accelerating the cure of the aminoplast are, for instance, ammonium chloride, the ammonium phosphates, urea hydrochloride, chloroacetamide, aniline hydrochloride, etc., as well as other weakly acidic materials widely employed for the purpose in the art. Obviously, the amount of cure accelerator employed for the purpose of accelerating the cured aminoplast resin may be varied within wide limits and generally is advantageously employed in amounts ranging, by weight, from about 1 to about 20, preferably from about 5 to 15 per cent, based on the weight of the aminoplast resin.

The mixture of the organopolysiloxane free of silicon-bonded hydrogen, aminoplast resin (including its own curing catalyst), and the metallic salt may be applied directly to the material desired to render water-repellent in any suitable manner. It is preferred to employ the mixture of ingredients in the form of either a dispersion or emulsion or as a solution (either true or colloidal solutions), wherein common solvents usually employed for the purpose are used as, for instance, aromatic hydrocarbons, chlorohydrocarbons, ethers, alcohols, etc., such as benzene, xylene, toluene, methylene chloride, trichloroethylene, dioxane, ethanol, butanol, or the like. Generally, it has been found desirable in making the treating composition (which will include, of course, the organopolysiloxane, the aminoplast resin, the metallic salt, any cure accelerator for accelerating the cure of the aminoplast, and the liquid medium, be it water or an organic solvent or mixture of both) that the mixture of active ingredients comprise on the order of from about 2 to 20 per cent of the weight of the treating composition designed for inducing water-repellency in the various materials.

The method whereby these treating mixtures may be prepared, as well as the concentration of the various ingredients, may obviously be varied widely without departing from the scope of the invention. For the most part, where the organopolysiloxane can be easily emulsified in water as the liquid medium, and where the metallic salt is of a water-soluble nature, or also easily emulsifiable, aqueous emulsions are advantageously used wherein emulsifying agents easily decomposable by heat are employed. In addition to such decomposable emulsifying agents, fugitive emulsifying agents, that is, emulsifying agents which are readily volatilized at temperatures at which drying and curing of the active ingredients in the water-repellent composition present on the treated materials is effected, may also be used. The quaternary ammonium halides or salts are examples of suitable emulsifying agents. They are decomposed on heating for a brief period before, for instance, the cloth or paper is damaged by the heating. Examples of such materials are, e. g., the alkyl aryl ammonium chlorides, for instance, trimethylbenzyl ammonium chloride, hexadecyldimethylammonium chloride, etc. Non-ionic emulsifying agents, such as the amide condensation products of fatty acids with organic amines are preferred in the treatment of cotton, wool, rayon and nylon. An example of such a non-cationic emulsifying agent is the product known as "Pluramine S-100," marketed by the Kearney Manufacturing Co., Inc., Kearney, New Jersey. Other suitably non-ionic emulsifying agents are polyethylene glycol condensates, polyethylene oxide condensates, etc. Obviously, the amount of emulsifying agent employed may be varied within wide limits. The actual amount of emulsifying agent employed will depend, for instance, upon the type of ingredients present in the mixture of ingredients, the type of emulsifying agent employed, the application intended, etc. Generally, the amount of emulsifying agent satisfactorily employed may range, for instance, from about 1.5 to about 3.5 per cent, by weight, based on the weight of the treating mixture. The amount used is not critical, and persons skilled in the art will have no difficulty in determining easily the amount which gives optimum results.

One method for making the treating compositions herein described which have been found so eminently useful for inducing water-repellency comprises first homogenizing water with the emulsifying agent until a homogeneous suspension of the emulsifying agent in water is obtained, the latter material being generally a rather heavy creamy composition. To this is slowly added the organopolysiloxane which, for illustrative purposes, is an organopolysiloxane oil having a hydrocarbon-to-silicon ratio of about 1.9 to 2.1, containing a small amount of an emulsion stabilizer such as, for example, oleic acid, etc. This mixture of ingredients is in turn again thoroughly homogenized until the organopolysiloxane is intimately dispersed throughout the water phase. Finally, an additional quantity of water is added to this dispersion or emulsion to bring the organopolysiloxane content of the water emulsion to the desired level. This material is often referred to as a "master emulsion." The master emulsion is then diluted with an additional amount of water containing, for instance, the water-soluble metallic salt (assuming that such a salt is employed in this description). Generally, the concentration of the organopolysiloxane present at this stage is approximately twice that which will be ultimately employed in the final treating solution. To this latter mixture is then added an equal quantity, by weight, of the aminoplast resin dissolved in an appropriate solvent, for example, water (if the aminoplast is sufficiently water-soluble). This latter mixture of ingredients is then treated, e. g., homogenized, in such a fashion that intimate dispersion of the various ingredients is effected so as to give a stable emulsion which is employed as the water-repellent composition. The aminoplast solution which is added in the step described immediately above advantageously contains the cure accelerator for the aminoplast resin.

The procedure described above for preparing water emulsions of treating compositions herein described may, of course, be varied within wide limits, and it is not intended that the description be limiting in any manner. Alternatively, where desired, organic solvents, preferably those which are easily volatilized at the temperatures at which treating of the cloth will be effected, may be employed. Thus, the organopolysiloxane may be advantageously dissolved in an organic solvent (many examples of which have been given above), especially when using resinous organopolysiloxanes of low organic-to-silicon ratios. The solution of the organopolysiloxane may then be emulsified with water employing the usual emulsifying agents, diluted where desired, and solutions, for instance, aqueous solutions of the aminoplast resins, the metallic salt, and the catalyst for the aminoplast incorporated and further emulsification effected until a homogeneous composition suitable for treating purposes is obtained. In such instances where different phases are present in the same mixture of ingredients, adequate precaution must be exercised to prevent separation of the phases or a breakdown of the emulsion or dispersion.

On a weight basis, I have obtained satisfactory water emulsions in which from 70 to 98 per cent of the emulsion comprises water, from 0.5 to 25 per cent, by weight, comprises either the urea or melamine resin, and from 0.1 to 12 per cent, by weight, thereof comprises the organopolysiloxane. It will, of course, be apparent to those skilled in the art that the proportion of ingredients may be varied, as has been mentioned above, without departing from the scope of the invention.

One specific procedure for making the water-repellent treating materials employed in the practice of my invention comprises mixing the required amounts of either the urea or melamine resin (advantageously in the form of a water solution or paste) with a concentrated organopolysiloxane-water emulsion (e. g., a 10 to 75 per cent concentration of the organopolysiloxane), adding the metallic salt and other cure accelerator which may be desired for the aminoplast, and thoroughly agitating the combination of ingredients until a homogeneous emulsion is formed. If desired, this latter emulsion may be diluted further with water to comprise, for instance, a concentration in the range of from about 1.0 to 30 per cent, preferably from 3 to 15 per cent, of active ingredients, namely, the organopolysiloxane, the aminoplast, and the metallic salt.

The mixture of ingredients useful for effecting water-repellency either in the form of a solution or an emulsion or otherwise may be applied to, for instance, any fabric or paper in any appropriate manner. Thus, the fabric may be dipped in the mixture of treating materials. The mixture may be applied to the fabric or paper by the use of dimensional equipment, such as a padder or quetch. The treating material may then be dried at temperatures ranging from about 50° to 250° C. to remove any water solvent or organic solvent which may be present and also to set and cure the organopolysiloxane and aminoplast resin to an infusible and insoluble state whereby the fabric or paper is rendered permanently hydrophobic. If decomposable emulsifying agents are employed, the latter will be decomposed during this heating. Obviously, the temperature of cure will vary depending on the type of organopolysiloxane employed, the aminoplast used, the type of metallic salt, the concentration of the various ingredients, the material being treated, the length of time during which the material being rendered water-repellent is subjected to the elevated temperatures, etc. Generally, at the temperatures described above, and such temperatures should be below those at which undesirable deterioration of the textile or paper will take place, the time in which the treated material should be heated may range about 10 seconds to about 5 to 10 minutes or even longer, for instance, as high as one-half hour. In some instances, it may be desirable to pass the treated textile or paper between squeeze rolls to increase the penetration of the water-repellent composition into either the fabric or paper, and to remove any excess of water-repellent composition above that required to impart the desired degree of water-repellency. It is generally desirable that the water-repellent material should be applied to the textile or paper in such a manner that the latter contains between 1 to 10 per cent, preferably between 1.5 and 5 per cent of the treating material, based upon the weight of the textile or paper being treated. This, of course, will vary with the type of textile or paper being rendered water-repellent, the type of weave, etc.

In order that those skilled in the art may better understand how the present invention may be practiced, the following examples are given by way of illustration and not by way of limitation. All parts are by weight. After treatment of the various cloths described in the following examples with the various treating mixtures, each treated cloth was washed by agitating it for approximately five minutes in clear water to remove any water-soluble material, and was thereafter subjected to a water spray test using the method set forth in the 1945 Year Book of the American Association of Textile Chemists and Colorists, volume 22, pages 229 to 233.

EXAMPLE 1

In this example textile fabrics made from cotton, rayon and nylon were treated with three different types of water-repellent compositions included within the scope of the present invention. One organopolysiloxane employed in one of the three water-repellent treating compositions was obtained by hydrolyzing with water essentially pure dimethyldichlorosilane containing at most 0.6 mol per cent methyltrichlorosilane; this methylpolysiloxane was identified as "Silicone No. 1." Another organopolysiloxane was obtained by hydrolyzing dimethyldichlorosilane containing 6 to 8 mol per cent methyltrichlorosilane with water; this was identified as "Silicone No. 2." A third organopolysiloxane was prepared by hydrolyzing essentially pure dimethyldichlorosilane, and thereafter equilibrating the hydrolysis product with hexamethyldisiloxane in the presence of sulfuric acid to give a chain-stopped methyl polysiloxane identified as "Silicone No. 3," the preparation of which is more particularly described in the aforementioned Patnode patents.

In order to prepare the water-repellent compositions employed in treating the various cloths described above, each of the silicone compositions described above was used with the aminoplast resin and the metallic salts as follows. More particularly, 40 grams of water were intimately mixed with about 7.5 grams of a non-ionic emulsifying agent, specifically, Pluramine S–100 described previously. Obviously, other types of suitable emulsifying agents may be employed. The mixture of water and emulsifying agent was thoroughly homogenized until a thick creamy mixture was obtained. To this creamy mixture were then added very slowly, while continuing further homogenization, 77 grams of the respective silicone products described above together with one gram of oleic acid as a stabilizing agent. After intimate homogenization of the ingredients, an additional 73.5 grams of water were added and the entire mixture intimately mixed to give a homogeneous composition. This latter mixture of ingredients in the form of a homogeneous emulsion contained about 38.5 per cent, by weight, silicone. About 20 grams of the last-described emulsion were then diluted with about 128 grams of water and about 2 grams of zirconium oxychloride octahydrate added and again thoroughly mixed. Thirty grams of a paste consisting of a water-soluble melamine-formaldehyde resin and water, of which paste 80 percent was the melamine-formaldehyde resin (Calco M–3 manufactured by the American Cyanamid Company) were added to 118 grams of water together with about 2 grams of an aminoplast accelerator, specifically, diammonium phosphate, and this mixture of ingredients thereafter formed a homogeneous solution. This latter melamine-formaldehyde resin solution containing the curing agent was then mixed with the final silicone emulsion (containing the zirconium oxychloride) described above and the ingredients thoroughly mixed until a stable homogeneous emulsion was obtained. This procedure was employed in connection with all three silicone compositions described previously. For convenience, each of the three water-repellent compositions will be identified as silicone water-repellents No. 1, No. 2, and No. 3, the numbers referring to the same numbers from which the original methylpolysiloxane was derived.

As controls, two other water-repellent compositions containing organopolysiloxanes having silicon-bonded hydrogen were also tested. One water-repellent composition, identified as Silicone Water-Repellent Composition No. 4, was prepared as follows. Methyldichlorosilane was cohydrolyzed with trimethylchlorosilane to give a chain-stopped methyl hydrogen polysiloxane well known in the art and more particularly described in Wilcock Patent 2,491,843, issued December 20, 1949. This chain-stopped methylpolysiloxane containing silicon-bonded hydrogen was thereafter made into a water-repellent treating composition employing the exact procedure, ingredients (including melamine-formaldehyde resin), and ratio of ingredients as described above in connection with the preparation of Silicone Water-Repellent Compositions Nos. 1 to 3, using in place of the zirconium oxychloride an equivalent amount of zinc acetate, which is the curing agent generally employed in connection with such a water-repellent.

As a further comparison, another water-repellent composition commercially available on the market was also tested, the latter composition comprising a chain-stopped methylpolysiloxane obtained by cohydrolyzing methyldichlorosilane, dimethyldichlorosilane and trimethylchlorosilane in which approximately 25 mol per cent of the methylchlorosilanes was methyldichlorosilane. The latter hydrolysis product was then processed to form a water-repellent composition identified as Silicone Water-Repellent Composition No. 5 employing the exact procedure, ingredients and ratio of ingredients as described above with the exception that instead of employing zirconium oxychloride, an equivalent amount of zinc acetate (recommended by the manufacturer) was used for the purpose.

The five silicone water-repellent compositions described above will be found to comprise aqueous emulsions containing approximately 2.5 per cent, by weight, of the methylpolysiloxane (either with or without silicon-bonded hydrogen), 8 per cent, by weight, of the water-soluble melamine-formaldehyde resin, and about 8 per cent, by weight, of the water-soluble metallic salt (calculated as the metal), based on the weight of the particular methylpolysiloxane employed. In each of the above silicone water-repellent compositions were immersed 8" x 8" squares of cotton cloth, rayon cloth and nylon cloth (three samples of each cloth) for about 30 seconds, the samples withdrawn and run through a padder or quetch adjusted to a pressure of about 45 to 60 pounds in order to remove excess treating solution, the immersion in the silicone water-repellent composition and the passage through the padder being carried out three times on each piece of cloth in order to assure complete impregnation of the cloth. The cloths were then hung in a 150° C. air-circulating oven for about 10 minutes to dry and to effect cure and conversion of the methylpolysiloxane and the melamine-formaldehyde resin. After removal from the oven and cooling to room temperature, each sample was rinsed in warm water for about 5 minutes to remove any residual water-soluble materials, and then dried at about 75° C. for about 45 minutes. Each sample of treated cloth was then conditioned in the air for about 30 minutes and thereafter subjected to spray rating tests similar to those described in the aforementioned 1945 Year Book of the American Association of Textile Chemists and Colorists. The following Table I shows the results of the initial spray rating on the various cloths, the spray rating after the stipulated number of launderings, and the spray rating after the stipulated number of dry cleanings. It will be noted that the letters appearing under the heading "Initial Spray Rating" are intended to indicate that Sample A was used in the subsequent laundering tests, Sample B was used in the subsequent dry cleaning tests, and Sample C when available was retained for future reference if it became necessary. The headings "C," "R," and "N" are intended to refer to cotton cloth, rayon cloth and nylon cloth, respectively. A spray rating of about 80 or above is considered satisfactory. If the spray rating dropped to 70 for two consecutive launderings or dry cleanings, generally the tests were discontinued.

Table I

| Water Repellent Composition No. | | Initial Spray Rating | | | Laundering Cycles | | | | Dry Cleaning Cycles | | | |
|---|---|---|---|---|---|---|---|---|---|---|---|---|
| | | A | B | C | 1 | 2 | 3 | 4 | 1 | 2 | 3 | 4 |
| 1[a] | C | 100 | 100 | 90 | 90 | 80 | 90 | ---- | 80 | 70 | 80 | ---- |
| | R | 100 | 100 | 100 | 100 | 100 | 90 | 100 | 80 | 80 | 80 | ---- |
| | N | 100 | 100 | 100 | 90 | 90 | 90 | 100 | 80 | 50 | 50 | ---- |
| 2[b] | C | 100 | 100 | 100 | 90 | 90 | 100 | 80 | 80 | 80 | 80 | 80 |
| | R | 100 | 100 | 100 | 100 | 100 | 100 | 100 | 80 | 80 | 80 | 80 |
| | N | 100 | 100 | 100 | 100 | 90 | 90 | 100 | 50 | 50 | 70 | 50 |
| 3 | C | 100 | 100 | 100 | 90 | 90 | 80 | 90 | 90 | 80 | 80 | 80 |
| | R | 100 | 100 | 100 | 90 | 100 | 100 | 100 | 100 | 80 | 80 | 70 |
| | N | 100 | 100 | 100 | 100 | 100 | 90 | 100 | 100 | 90 | 90 | 90 |
| 4 | C | 100 | 100 | 100 | 70 | 0 | 0 | ---- | 80 | 70 | 70 | ---- |
| | R | 100 | 100 | 100 | 90 | 70 | 70 | ---- | 100 | 100 | 80 | ---- |
| | N | 100 | 90 | 100 | 80 | 100 | 70 | ---- | 90 | 100 | 80 | ---- |
| 5 | C | 100 | 100 | 100 | 70 | 80 | 0 | ---- | 100 | 100 | 70 | ---- |
| | R | 100 | 100 | 100 | 100 | 80 | 80 | ---- | 100 | 100 | 90 | ---- |
| | N | 100 | 100 | 100 | 100 | 90 | 80 | ---- | 90 | 100 | 90 | ---- |

[a] The use of zirconium tetrachloride in place of zirconium oxychloride gave equivalent results.
[b] Tests have shown that spray ratings of 80 or better are obtainable even after six launderings. Varying the amount of the zirconium salt in an amount calculated as zirconium metal varying from about 2 to 70 per cent, by weight, based on the weight of the methylpolysiloxane did not materially influence the spray ratings even after several launderings or dry cleanings.

EXAMPLE 2

For this example, water-repellent compositions were prepared in which the ratio of organic groups to silicon atoms in the organopolysiloxane free of silicon-bonded hydrogen was well below two. More particularly, a mixture of ingredients comprising, by weight, 45.7 parts methyltrichlorosilane, 38.7 parts phenyltrichlorosilane, and 15.6 parts dimethyldichlorosilane was hydrolyzed in the presence of xylene and mineral spirits as organic solvents to give a silicone resin solution of approximately 60 per cent solids. This latter phenylmethylpolysiloxane was formed into a water emulsion in the same manner as described in Example 1 with the exception that the phenylmethylpolysiloxane, instead of being added as a straight organopolysiloxane, was added in the form of a solution of the methylphenylpolysiloxane. A water-repellent composition was prepared employing the same procedure, ingredients and ratio of ingredients as described in Example 1 for Silicone Water-Repellent Composition No. 1, this water-repellent composition being identified as "Silicone Water-Repellent Composition No. 6." Another sample of an organopolysiloxane was also prepared by cohydrolyzing, on a weight basis, 25 per cent methyltrichlorosilane and 75 per cent dimethyldichlorosilane to give a methylpolysiloxane from which was obtained a thick, oily material which was again compounded into a water-repellent composition employing the same procedure, ingredients and ratio of ingredients as described in Example 1 for Silicone Water-Repellent Composition No. 1. This latter composition was identified as "Silicone Water-Repellent Composition No. 7." When cotton, rayon and nylon cloth were treated with each of these silicone water-repellent compositions, it was found that the initial spray ratings for each of the cloths was 100. After the first laundering, it was found that the spray rating was 90 or above; after the first dry cleaning of each of the cloths the spray rating was 80 or above and in general maintained a rating of around 80 or above even after three dry cleanings.

EXAMPLE 3

In this example, a methylpolysiloxane was obtained by hydrolyzing the crude reaction product obtained in the reaction between methyl chloride and silicon in the presence of copper as a catalyst (in accordance with the procedure described and claimed in Rochow Patent 2,380,995 issued August 7, 1945, and assigned to the same assignee as the present invention), which crude reaction product comprised essentially a mixture of methyl-substituted silicon compositions, of which approximately 60 to 65 per cent was dimethyldichlorosilane, 5 to 10 per cent was trimethylchlorosilane, and 15 to 20 per cent was methyltrichlorosilane, there additionally being present small amounts of such materials as silicon tetrachloride, silicon tetramethyl, hexamethyldisilane, methyl-substituted polysilanes, methyl chloro-substituted polysilanes, etc. Hydrolysis of this reaction product yielded an oily product which was formed into a water-repellent composition in the same way as was done in Example 1 with Silicone Water-Repellent Composition No. 1, employing the same procedure, ingredients and ratio of ingredients. Additional silicone water-repellent compositions were prepared in which the same ingredients were used with the exception that in one case, equivalent amounts of titanium tetrachloride, zirconium tetrachloride, stannic chloride and stannous chloride were substituted in place of the zirconium oxychloride employed in Example 1. Cotton, rayon and nylon cloths were treated with the respective silicone water-repellent compositions in the same manner as described in Example 1 and tested for the spray rating with the results shown in Table II.

Table II

| Metallic Salt In Silicone Water-Repellent Composition | | Initial Spray Rating | | | Laundering Cycles | | | | Dry Cleaning Cycles | | | |
|---|---|---|---|---|---|---|---|---|---|---|---|---|
| | | A | B | C | 1 | 2 | 3 | 4 | 1 | 2 | 3 | 4 |
| ZrCl₄ | C | 100 | 100 | 100 | 90 | 90 | 90 | ---- | 80 | 80 | 80 | ---- |
| | R | 100 | 100 | 100 | 100 | 100 | 100 | ---- | 80 | 80 | 80 | 80 |
| | N | 100 | 100 | 100 | 100 | 100 | 100 | ---- | 50 | 50 | ---- | ---- |
| TiCl₄ | C | 90 | 80 | 90 | 100 | 80 | 80 | ---- | 80 | 80 | 80 | 80 |
| | R | 90 | 100 | 90 | 100 | 80 | 80 | ---- | 80 | 80 | 80 | 80 |
| | N | 100 | 100 | 100 | 100 | 100 | 70 | ---- | 50 | 50 | ---- | ---- |
| SnCl₂ | C | 90 | 80 | 80 | 80 | 50 | ---- | ---- | 80 | 80 | ---- | ---- |
| | R | 100 | 80 | 80 | 70 | ---- | ---- | ---- | 90 | 80 | 80 | 50 |
| | N | 100 | 100 | 100 | 100 | 90 | ---- | ---- | 90 | 80 | 80 | ---- |
| SnCl₄ | C | 80 | 80 | 80 | 80 | 80 | 80 | 80 | 80 | 80 | 80 | ---- |
| | R | 100 | 90 | 80 | 80 | 80 | 80 | ---- | 80 | 80 | 80 | 80 |
| | N | 80 | 80 | 70 | 70 | 70 | ---- | ---- | 50 | 50 | ---- | ---- |

It will, of course, be apparent to those skilled in the art that in addition to the organopolysiloxanes free of silicon-bonded hydrogen disclosed in the foregoing examples, other organopolysiloxanes, many examples of which have been given previously, may be employed without departing from the scope of the invention. The presence of allyl or vinyl groups may be included in the organopolysiloxane. It is to be understood that small amounts of organopolysiloxanes containing silicon-bonded hydrogen may be present in the water-repellent compositions herein described without detrimental effect. However, the presence of such organopolysiloxanes containing silicon-bonded hydrogen is not essential in the practice of the present invention, and in this respect the use of the water-repellent compositions herein described and claimed are unique in so far as is known in not requiring the presence of any organopolysiloxanes containing silicon-bonded hydrogen as was heretofore believed essential in the treatment of various fibrous sheet materials such as textiles and paper to render them water-repellent. Obviously, no useful purpose will be served to incorporate or use in my water-repellent compositions organopolysiloxanes containing silicon-bonded hydrogen because of the expense of the latter materials and the unavailability of the intermediate compositions required to prepare these organopolysiloxanes containing silicon-bonded hydrogen.

It will also be apparent to those skilled in the art that in place of the agents for curing the organopolysiloxane employed in the examples above, other metallic salts, many examples of which have been given previously, may be used with satisfactory results. In addition to the cloths described above, other textile materials as, for instance, wool (whose shrink properties on laundering can be reduced using my water-repellent compositions), many of the newer synthetic fabrics made from, for example, the polyacrylonitrile fibers, etc., as well as various papers including kraft papers, wrapping papers, etc., may be treated with my water-repellent compositions to impart hydrophobic properties to the treated materials. Various containers, for instance, burlap bags, cardboard cartons, etc., may be rendered water-repellent or hydrophobic in accordance with the practice of the present invention. Obviously, it will be apparent to persons skilled in the art that the conditions of treatment and the proportions of ingredients may also be varied without departing from the scope of the invention. The optimum conditions for treatment can be readily determined and are not critical.

What I claim as new and desire to secure by Letters Patent of the United States is:

1. A composition of matter substantially free of organopolysiloxanes containing hydrogen attached directly to silicon and comprising (a) an organopolysiloxane containing from 1.1 to 2.25 organic groups per silicon atom and being free of silicon-bonded hydrogen in which the organic groups are attached to silicon by carbon-silicon linkages, at least 50 percent of the organic groups being methyl groups, the remainder of the groups being selected from the class consisting of methyl, ethyl and phenyl radicals, (b) an incompletely condensed aminoplast resin selected from the class consisting of urea-aldehyde and melamine-aldehyde resins and (c) a metallic salt capable of effecting curing of the organopolysiloxane whose metal ion is selected from the class consisting of titanium, zirconium, tin, lead, aluminum, zinc, strontium and nickel, there being present, by weight, in the aforementioned composition of matter from 5 to 50 percent of the aforesaid organopolysiloxane, based on the weight of the aminoplast resin, and the metallic salt being present in an amount equal to from 0.1 to 20 percent, by weight, based on the weight of the organopolysiloxane.

2. An organosiloxane mixture for rendering organic fabrics water-repellent substantially free of organopolysiloxanes containing hydrogen attached directly to silicon and comprising (a) a methylpolysiloxane free of silicon-bonded hydrogen having an average of from 1.1 to 2.25 methyl groups per silicon atom and consisting of methyl groups and silicon and oxygen atoms, (b) an incompletely condensed aminoplast resin selected from the class consisting of urea-aldehyde and melamine-aldehyde resins and (c) a water-soluble metallic salt capable of effecting curing of the organopolysiloxane whose metal ion is selected from the class consisting of titanium, zirconium, tin, lead, aluminum, zinc, strontium and nickel, the aforesaid methylpolysiloxane being present, by weight, in an amount equal to from 5 to 50 percent of the weight of the aforesaid aminoplast resin, and the metallic salt being present, by weight, in an amount equal to from 0.1 to 20 percent, based on the weight of the methylpolysiloxane.

3. An organosiloxane mixture for rendering organic fabrics water-repellent substantially free of organopolysiloxanes containing hydrogen attached directly to silicon and comprising (a) a methylphenylpolysiloxane free of silicon-bonded hydrogen containing an average of from 1.1 to 2.25 total methyl and phenyl groups per silicon atom and in which at least 50 percent of the organic groups are methyl groups, the remainder of the groups being phenyl groups other than the excess of methyl groups over 50 percent, (b) an incompletely condensed aminoplast resin selected from the class consisting of urea-aldehyde and melamine-aldehyde resins and (c) a water-soluble metallic salt capable of effecting curing of the organopolysiloxane whose metal ion is selected from the class consisting of titanium, zirconium, tin, lead, aluminum, zinc, strontium and nickel, the aforesaid methyl phenylpolysiloxane being present, by weight, in an amount equal to from 5 to 50 percent of the weight of the aforesaid aminoplast resin, and the metallic salt being present, by weight, in an amount equal to from 0.1 to 20 percent, based on the weight of the methyl phenylpolysiloxane.

4. An aqueous emulsion of the organosiloxane mixture of claim 3.

5. A composition of matter substantially free of organopolysiloxanes containing hydrogen bonded directly to silicon and comprising (a) an organopolysiloxane free of silicon-bonded hydrogen containing an average of from about 1.1 to 2.25 organic groups per silicon atom and in which the organic groups are attached to silicon by carbon-silicon linkages, at least 50 percent of the organic groups being methyl groups, the remainder of the groups being selected from the class consisting of methyl, ethyl and phenyl radicals, (b) a water-soluble incompletely condensed melamine-formaldehyde condensation product and (c) a water-soluble zirconium salt capable of effecting curing of the organopolysiloxane, the aforesaid organopolysiloxane being present, by weight, in an amount equal to from 5 to 50 percent of the weight of the melamine-formaldehyde condensation product, and the zirconium salt being present, by weight, in an amount equal to from 0.1 to 20 percent, based on the weight of the organopolysiloxane.

6. A composition of matter substantially free of organopolysiloxanes containing hydrogen bonded directly to silicon and comprising (a) an organopolysiloxane free of silicon-bonded hydrogen containing an average of from 1.1 to 2.25 organic groups per silicon atom and in which the organic groups are attached to silicon by carbon-silicon linkages, at least 50 percent of the organic groups being methyl groups, the remainder of the groups being selected from the class consisting of methyl, ethyl and phenyl radicals, (b) a water-soluble incompletely condensed melamine-formaldehyde condensation product and (c) a water-soluble titanium salt capable of effecting curing of the organopolysiloxane, the aforesaid organopolysiloxane being present, by weight, in an amount equal to from 5 to 50 percent of the weight of the aforesaid melamine-formaldehyde condensation product, and the titanium salt being present, by weight, in an amount equal to from 0.1 to 20 percent of the weight of the organopolysiloxane.

7. A composition of matter substantially free of organopolysiloxanes containing silicon bonded directly to hydrogen and comprising (a) an organopolysiloxane free of silicon-bonded hydrogen containing an average of from 1.1 to 2.25 organic groups per silicon atom and in which the organic groups are attached to silicon by carbon-silicon linkages, at least 50 percent of the organic groups being methyl groups, the remainder of the groups being selected from the class consisting of methyl, ethyl and phenyl radicals, (b) a water-soluble incompletely condensed melamine-formaldehyde condensation product and (c) a water-soluble tin salt capable of effecting curing of the organopolysiloxane, the aforesaid organopolysiloxane present, by weight, in an amount equal to from 5 to 50 percent, based on the weight of the melamine-formaldehyde condensation product, and the tin salt being present in an amount equal to from 0.1 to 20 percent, by weight, based on the weight of the organopolysiloxane.

8. A composition of matter substantially free of organopolysiloxanes containing hydrogen bonded directly to silicon and comprising (a) an organopolysiloxane free of silicon-bonded hydrogen containing an average of from 1.1 to 2.25 organic groups per silicon atom in which the organic groups are attached to silicon by carbon-silicon linkages, at least 50 percent of the organic groups being methyl groups, the remainder of the groups being selected from the class consisting of methyl, ethyl and phenyl radicals, (b) a water-soluble incompletely condensed melamine-formaldehyde condensation product and (c) a water-soluble zinc salt capable of effecting curing of the organopolysiloxane, the aforementioned organopolysiloxane being present, by weight, in an amount equal to from 5 to 50 percent of the weight of the melamine-formaldehyde condensation product, and the zinc salt being present in an amount equal to from 0.1 to 20 percent, by weight, based on the weight of the organopolysiloxane.

9. A composition of matter substantially free of organopolysiloxanes containing hydrogen attached directly to silicon and capable of inducing water-repellency in textiles and papers comprising (a) a methylpolysiloxane free of silicon-bonded hydrogen and consisting of methyl radicals and silicon and oxygen atoms, said methyl groups being present in the ratio of from about 1.1 to 2.25 methyl groups per silicon atom, (b) a water-soluble incompletely condensed melamine-formaldehyde resin and (c) zirconium tetrachloride, the said methylpolysiloxane being present, by weight, in an amount equal to from 5 to 50 percent of the weight of the melamine-formaldehyde resin, and the zirconium tetrachloride being present in an amount equal to from 0.1 to 20 percent, by weight, based on the weight of the methylpolysiloxane.

10. An aqueous emulsion of the methylpolysiloxane mixture of claim 9.

11. A composition of matter substantially free of organopolysiloxanes containing silicon-bonded hydrogen and capable of inducing water-repellency in textiles and papers comprising (a) a methylpolysiloxane consisting of methyl radicals and silicon and oxygen atoms, and being free of silicon-bonded hydrogen, said methyl radicals being present in the ratio of from about 1.1 to 2.25 methyl groups per silicon atom, (b) a water-soluble incompletely condensed melamine-formaldehyde resin and (c) zirconium oxychloride, the methylpolysiloxane being present, by weight, in an amount equal to from 5 to 50 per cent of the weight of the melamine-formaldehyde resin, and the zirconium oxychloride being present in an amount equal to from 0.1 to 20 per cent, by weight, based on the weight of the methylpolysiloxane.

12. An aqueous emulsion of the methylpolysiloxane mixture of claim 11.

13. A composition of matter substantially free of organopolysiloxanes containing silicon attached directly to hydrogen and capable of inducing water-repellency in textiles and papers comprising (a) a methylpolysiloxane consisting of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin and (c) titanium tetrachloride, the said methylpolysiloxane being present, by weight, in an amount equal to from 5 to 50 per cent, based on the weight of the melamine-formaldehyde resin, and the titanium tetrachloride being present, by weight, in an amount equal to from 0.1 to 20 per cent, based on the weight of the methylpolysiloxane.

14. An aqueous emulsion of the methylpolysiloxane mixture of claim 13.

15. A composition of matter substantially free of organopolysiloxanes containing hydrogen attached directly to silicon capable of inducing water-repellency in textiles and papers comprising (a) a methylpolysiloxane consisting of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin and (c) stannous chloride, the said methylpolysiloxane being present, by weight, in an amount equal to from 5 to 50 per cent of the weight of the melamine-formaldehyde resin, and the stannous chloride being present in an amount equal to from 0.1 to 20 per cent, by weight, based on the weight of the methylpolysiloxane.

16. An aqueous emulsion of the methylpolysiloxane mixture of claim 15.

17. A composition of matter substantially free of organopolysiloxanes containing hydrogen attached directly to silicon capable of inducing water repellency in textiles and papers comprising (a) a methylpolysiloxane consisting solely of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin and (c) zinc acetate, the said methylpolysiloxane being present, by weight, in an amount equal to from 5 to 50 per cent of the weight of the melamine-formaldehyde resin, and the zinc acetate being present in an amount equal to from 0.1 to 20 per cent, by weight, based on the weight of the methylpolysiloxane.

18. An aqueous emulsion of the methylpolysiloxane mixture of claim 17.

19. A composition of matter substantially free of organopolysiloxanes containing hydrogen attached directly to silicon and comprising (a) an organopolysiloxane free of silicon-bonded hydrogen containing an average of from 1.1 to 2.25 organic groups per silicon atom and in which the organic groups are attached to silicon by carbon-silicon linkages, at least 50 per cent of the organic groups being methyl groups, the remainder of the groups being selected from the class consisting of methyl, ethyl and phenyl radicals, (b) an incompletely condensed aminoplast resin selected from the class consisting of urea-aldehyde and melamine-aldehyde resins, (c) a metallic salt capable of effecting curing of the organopolysiloxane whose metal ion is selected from the class consisting of titanium, zirconium, tin, lead, aluminum, zinc, strontium and nickel, the aforesaid organopolysiloxane being present in an amount equal to from 5 to 50 per cent, by weight, based on the weight of the aminoplast resin, and the metallic salt being present in an amount equal to from 0.1 to 20 per cent, by weight, based on the weight of the organopolysiloxane, and (d) a curing agent for the aminoplast resin in an amount equal to from 1 to 20 per cent, by weight, based on the weight of the aminoplast resin.

20. An organosiloxane mixture free of organopolysiloxanes containing silicon attached directly to hydrogen for rendering organic fabrics water-repellent comprising (a) a methylpolysiloxane free of silicon-bonded hydrogen containing an average of from about 1.1 to 2.25 methyl groups per silicon atom and consisting of methyl groups, and silicon and oxygen atoms, (b) an incompletely condensed aminoplast resin selected from the class consisting of urea-aldehyde and melamine-aldehyde resins, (c) a water-soluble metallic salt capable of effecting curing of the methylpolysiloxane whose metal ion is selected from the class consisting of titanium, zirconium, tin, lead, aluminum, zinc, strontium and nickel, the said methylpolysiloxane being present, by weight, in an amount equal to from 5 to 50 per cent of the weight of the aminoplast resin, and the metallic salt being present in an amount equal to from 0.1 to 20 per cent, by weight, based on the weight of the methylpolysiloxane, and (d) a curing agent for the aminoplast resin in an amount equal to from 1 to 20 per cent, by weight, based on the weight of the aminoplast resin.

21. A composition of matter substantially free of organopolysiloxanes containing hydrogen attached directly to silicon and capable of inducing water-repellency in textiles and papers comprising (a) a methylpolysiloxane free of silicon-bonded hydrogen and consisting of methyl radicals and silicon and oxygen atoms, said methyl groups being present in the ratio of from about 1.1 to 2.25 methyl groups per silicon atom, (b) a water-soluble incompletely condensed melamine-formaldehyde resin, (c) zirconium tetrachloride, the said methylpolysiloxane being present, by weight, in an amount equal to from 5 to 50 per cent, based on the weight of the melamine-formaldehyde resin, and the zirconium tetrachloride being present in an amount equal to from 0.1 to 20 per cent, by weight, based on the weight of the methylpolysiloxane, and (d) a curing agent for the melamine-formaldehyde resin in an amount equal to from 1 to 20 per cent, by weight, based on the weight of the latter resin.

22. A composition of matter substantially free of organopolysiloxanes containing silicon bonded directly to hydrogen capable of inducing water-repellency in textiles and papers comprising (a) a methylpolysiloxane consisting of methyl radicals and silicon and oxygen atoms, and being free of silicon-bonded hydrogen, said methyl radicals being present in the ratio of from about 1.1 to 2.25 methyl groups per silicon atom, (b) a water-soluble incompletely condensed melamine-formaldehyde resin, (c) zirconium oxychloride, the said methylpolysiloxane being present in an amount equal to from 5 to 50 per cent, by weight, based on the weight of the melamine-formaldehyde resin, and the zirconium oxychloride being present in an amount equal to from 0.1 to 20 per cent, by weight, based on the weight of the methylpolysiloxane, and (d) a curing agent for the melamine-formaldehyde resin in an amount equal to from 1 to 20 per cent, by weight, based on the weight of the latter resin.

23. A composition of matter substantially free of organopolysiloxanes containing hydrogen bonded directly to silicon and capable of inducing water-repellency in textiles and papers comprising (a) a methylpolysiloxane consisting of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin, (c) titanium tetrachloride, the said methylpolysiloxane being present, by weight, in an amount equal to from 5 to 50 per cent based on the weight of the melamine-formaldehyde resin, and the titanium tetrachloride being present in an amount equal to from 0.1 to 20 per cent, by weight, based on the weight of the methylpolysiloxane, and (d) a curing agent for the melamine-formaldehyde resin in an amount equal to from 1 to 20 per cent, by weight, based on the weight of the latter resin.

24. A composition of matter substantially free of organopolysiloxanes containing hydrogen bonded directly to silicon and capable of inducing water-repellency in textiles and papers comprising (a) a methylpolysiloxane consisting of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin, (c) stannous chloride, the said methylpolysiloxane being present, by weight, in an amount equal to from 5 to 50 per cent, based on the weight of the melamine-formaldehyde resin, and the stannous chloride being present in an amount equal to from 0.1 to 20 per cent, by weight, based on the weight of the said methylpolysiloxane, and (d) a curing agent for the melamine-formaldehyde resin in an amount equal to from 1 to 20 per cent, by weight, based on the weight of the latter resin.

25. A composition of matter substantially free of organopolysiloxanes containing hydrogen attached directly to silicon and capable of inducing water-repellency in textiles and papers comprising (a) a methylpolysiloxane consisting solely of methyl radicals and silicon and oxygen atoms, and being free of silicon-bonded hydrogen, said methyl groups being present in the ratio of from about 1.1 to 2.25 methyl groups per silicon atom, (b) a water-soluble incompletely condensed melamine-formaldehyde resin, (c) zinc acetate, the said methylpolysiloxane being present in an amount equal to from 5 to 50 per cent, by weight, based on the weight of the melamine-formaldehyde resin, and the zinc acetate being present in an amount equal to from 0.1 to 20 per cent, by weight, based on the weight of the methylpolysiloxane, and (d) a curing agent for the melamine-formaldehyde resin in an amount equal to from 1 to 20 per cent, by weight, based on the weight of the latter resin.

26. A porous sheet material treated with the composition defined in claim 1 to render it water-repellent.

27. A textile material treated with the composition defined in claim 2 to render it water-repellent.

28. A textile material treated with the composition defined in claim 9 to render it water-repellent.

29. A textile material treated with the composition defined in claim 11 to render it water-repellent.

30. A textile material treated with the composition defined in claim 13 to render it water-repellent.

31. A textile material treated with the composition defined in claim 15 to render it water-repellent.

32. A textile material treated with the composition defined in claim 17 to render it water-repellent.

33. A textile material treated with a composition of matter substantially free of organopolysiloxanes containing hydrogen attached directly to silicon and capable of rendering it water-repellent and comprising (a) a methylpolysiloxane free of silicon-bonded hydrogen and consisting of methyl radicals and silicon and oxygen atoms, said methyl radicals being present in the ratio of from about 1.1 to 2.25 methyl groups per silicon atom, (b) a water-soluble incompletely condensed melamine-formaldehyde resin, (c) zirconium oxychloride as a curing agent for the methylpolysiloxane, the said methylpolysiloxane being present, by weight, in an amount equal to from 5 to 50 per cent, based on the weight of the melamine-formaldehyde resin, and the zirconium oxychloride being present in an amount equal to from 0.1 to 20 per cent, by weight, based on the weight of the melamine-formaldehyde resin, and (d) a small amount of a cure accelerator for the melamine-formaldehyde resin, and thereafter heated to cause setting and curing of the methylpolysiloxane and the melamine-formaldehyde resin.

References Cited in the file of this patent

UNITED STATES PATENTS

| | | |
|---|---|---|
| 2,453,562 | Wright | Nov. 9, 1948 |
| 2,588,365 | Dennett | Mar. 11, 1952 |
| 2,612,482 | Rosmussen | Sept. 30, 1952 |